United States Patent [19]

Ikeda et al.

[11] 4,294,707

[45] Oct. 13, 1981

[54] METHOD FOR SEPARATING BLOOD AND A BARRIER DEVICE THEREFOR

[75] Inventors: Tatsuhiko Ikeda, Kawasaki; Soichiro Terada, Tama, both of Japan

[73] Assignee: Terumo Corporation, Tokyo, Japan

[21] Appl. No.: 131,874

[22] Filed: Mar. 19, 1980

[30] Foreign Application Priority Data

Mar. 23, 1979 [JP] Japan ................................ 54-33943

[51] Int. Cl.[3] ............................................ B01D 21/26

[52] U.S. Cl. .................................... 210/782; 210/359; 210/516; 210/927; 23/230 B; 422/101; 233/1 A; 233/26

[58] Field of Search ....................... 210/77, 78, 83, 84, 210/359, 514–518, DIG. 23, DIG. 24; 233/1 A, 2, 26; 23/230 B; 422/101

[56] References Cited

U.S. PATENT DOCUMENTS

| | | | |
|---|---|---|---|
| 3,508,653 | 4/1970 | Coleman | 210/DIG. 23 |
| 3,894,950 | 7/1975 | Ayres | 210/DIG. 23 |
| 3,894,951 | 7/1975 | Ayres | 210/DIG. 23 |
| 3,931,018 | 1/1976 | North | 210/DIG. 23 |
| 3,972,812 | 8/1976 | Gresel | 210/DIG. 23 |
| 4,052,320 | 10/1977 | Jakubowicz | 210/DIG. 23 |
| 4,134,832 | 1/1979 | Heimeeid | 233/26 |
| 4,154,690 | 5/1979 | Ballies | 210/DIG. 23 |
| 4,202,769 | 5/1980 | Greenspun | 210/DIG. 23 |

*Primary Examiner*—Ernest G. Therkorn
*Attorney, Agent, or Firm*—Frishauf, Holtz, Goodman and Woodward

[57] ABSTRACT

Disclosed is a method for centrifuging serum which comprises steps of introducing a barrier having an elastic porous member at least at its principle part into a blood-collecting tube and centrifuging serum, the elastic porous member having porosity of 40% or more, continuous-pore size of 50 to 400 $\mu$, and a cross section larger than that of the blood-collecting tube. Also disclosed is a barrier to be introduced into a blood-collecting tube, comprising an elastic porous member having porosity of 40% or more, continuous-pore size of 50 to 400 $\mu$, and a cross section larger than that of the blood-collecting tube, the bottom portion of the elastic porous member preferably being a relatively hard portion with smaller outside diameter.

16 Claims, 16 Drawing Figures

METHOD FOR SEPARATING BLOOD AND A BARRIER DEVICE THEREFOR

BACKGROUND OF THE INVENTION

This invention relates to a method for separating blood into a solid part including blood corpuscles and a liquid part including serum by centrifugation, and a barrier used for such method.

In a blood test, blood is generally separated into serum and cellular solid matters such as blood corpuscles by centrifugation, and only the serum is collected for analysis and examination. According to a well-known method for separating the serum, blood collected in a test tube is centrifuged, material such as gel material composed of silicone-silica which has an intermediate specific gravity between those of the serum and cellular solid matters is put in the test tube, the gel material is interposed between the serum and cellular matters by centrifugation, and the serum is separated by decantation. In this case, however, it is difficult perfectly to prevent fibrin and other solid matters from being mixed in the serum.

Such mixing of blood corpuscles, fibrin, etc. in the serum is undesirable because it may cause clog of instrument nozzle as well as errors in measurement.

Accordingly, as a blood separator capable of preventing such mixing in the serum, there is proposed a piston member in which a solid weight for specific gravity adjustment is coupled with a flexible fiber member which is large enough to be in slidable contact with the inside wall of a blood-collecting tube, and having a specific gravity of 1.03 to 1.09 as a whole is inserted in the blood-collecting tube (United States Pat. No. 3,931,018). Formed of two submembers with different specific gravities, porous and solid submembers that are bonded together, the piston member is not an entirely satisfactory structure, requiring much labor in manufacture.

This invention is contrived in consideration of the above circumstances, and is intended to provide a method for separating blood and a device therefor capable of simplifying manufacture and reducing production cost without any possibility of causing blood cells, fibrin, and other solid matters to be mixed with serum.

SUMMARY OF THE INVENTION

According to this invention, there is provided a method for separating blood collected in a blood-collecting tube into a serum part and a solid component part by centrifugation, comprising introducing a barrier formed of an elastic porous member, preferably a foamed plastic member, into the blood-collecting tube, the elastic porous member having porosity of 40% or more, and preferably 97 to 98%, a continuous-pore size of 50 to 400μ, overall true specific gravity greater than that of the serum part, and a cross section larger than that of the blood-collecting tube; moving the elastic porous member to the interface between a serum part layer and a solid component layer in the blood by centrifugal force produced in centrifuging the blood; and separating the serum in the blood.

Further, according to this invention, there is provided a barrier for centrifugation of blood which comprises an elastic porous member, preferably a foamed plastic member, having porosity of 40% or more, and preferably 97 to 98%, a continuous-pore size of 50 to 400μ, overall true specific gravity greater than that of serum, and, at least at a part thereof, a cross section a little larger than that of a blood-collecting tube.

DETAILED DESCRIPTION OF THE PREFERRED EMBODIMENTS

Figure 1A:
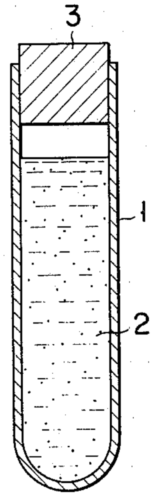
FIGS. 1(A) to 1(C) are sectional views of a blood separator according to an embodiment of this invention illustrating processes of blood separation.

As compared with the prior art method or device for blood separation, a unique point of this invention lies in that an elastic member with continuous pores of specified size is used directly singly or substantially singly as a phase separator (or barrier). Another peculiar point of the invention is that, although the true specific gravity of the barrier formed of such elastic member need be greater than that of serum, it need not always be smaller than that of the solid-phase part of the blood in separating the serum unless hemolysis is caused. This may be attributed to a fact that the whole or principal part of the barrier of the invention, being a porous member, has extremely small mass (e.g. 100 to 300 mg). In consideration of the circumstances that all the barriers of this type so far are so designed as to have intermediate specific gravities between those of two phases to be separated, the idea or spirit of this invention is quite novel and may greatly widen the variety of available materials.

The elastic porous member constituting at least the principal part of the barrier of the invention may be formed of elastic plastics foam, such as polyurethane foam, rubber foam (e.g. silicone rubber latex), polyolefin foam, polyvinyl chloride foam, polyformal resin, etc., having porosity of 40% or more, preferably 97 to 98%, and continuous-pore size of 50 to 400μ, preferably 250 to 400μ. If the porosity and pore size are smaller than those as specified, the isolation of the serum would be obtained in the ordinary centrifugal operation of 1,000-1,200 G, 10 minutes. Pore size of more than 400μ is not desirable, since blood corpuscles would pass through a foam of such a large pore size, thereby contaminating serum phase obtained. In this case, the 25% compressive hardness (JIS K-6401 Test Method established in 1974) of the barrier should preferably be 5 to 150 kg/cm$^2$. Moreover, it is expressly desirable that the barrier of the invention should be hydrophilic by nature or be made hydrophilic by some treatment for hydrophilicity. Such hydrophilic property is preferred because it will enable the serum quickly to penetrate the pores when the barrier is brought in contact with the blood, thereby facilitating the movement of the barrier. Elastic porous nonwoven cloth may also be useful as far as pores thereof substantially meets above conditions.

Overall specific gravity of the barrier should preferably adjusted to 1.2 or more, more preferably 1.2 to 1.4. The barrier may be of any shape as long as at least a part of the barrier has a cross section a little larger than that of a blood-collecting tube for centrifugation used with the barrier so that the outer periphery of the large-diameter portion of the barrier may rub against the inside wall of the tube during centrifugation. According to this invention, as described above, a single elastic porous member can be directly used for the barrier. Alternatively, however, the outer peripheral portion of the barrier may be coated with silicone, or two or more elastic porous members may be combined with one another or with other materials. For example, a tube member with the outside diameter somewhat smaller than the inside diameter of the blood-collecting tube used, e.g. a plastic tube, may be fitted on the lower peripheral surface of a columnar or cylindrical barrier so as to reduce the area of contact and hence the frictional resistance between the barrier and the inside wall of the blood-collecting tube, thereby facilitating the slide of the barrier during centrifugation. In this case, however, the specific gravity of the combination of the elastic porous member and the tube member need be greater than that of serum. The tube member may be formed of any thermally contractive material, such as polyolefin, polyvinyl chloride, nylon, polyester, polycarbonate, polyurethane, or ethylene-vinyl acetate copolymer.

As another modified example, there may be used a columnar elastic porous member in the form of e.g. a truncated cone which has cross sections substantially larger and smaller than that of the interior of the blood-collecting tube used at its upper and lower portion respectively, and is bottomed with a solid or porous hard layer. The hard layer may be formed by impregnating relatively hard plastic into the bottom portion of the porous member and solidifying the plastic, or by gluing a solid or porous relatively hard plastic sheet to the bottom portion. Having the hard bottom portion, the barrier of such construction exhibits extremely large deformation resistance during centrifugation, so that it may be prevented from turning sideways or being distorted while sliding down the tube, thereby ensuring the descending movement of the barrier in a properly erected state during centrifugation. Furthermore, the shape of the final product may be obtained directly by stamping out a truncated-cone-shaped member after gluing a hard plastic sheet to one side of an elastic porous sheet or after impregnating a solution of hard plastic into the porous sheet to a predetermined thickness, so that the manufacture of the barrier may substantially be simplified, ensuring reduction in production cost.

In view of the yield of serum, the volume of the barrier should be minimized. The porous member may be joined with the tube member, hard plastic sheet or the like by using adhesives, heat sealing or any other suitable means.

In combining the elastic porous member with the additional member, the materials and designs for these members need be selected so that a relationship $$\left(\frac{A-d}{d'-A}\right) X = Y$$

may be obtained where the volume and specific gravity of the elastic porous member are X and d respectively, the volume and specific gravity of the additional member are Y and d' respectively, and the overall specific gravity required is A.

Operations required for centrifuging the blood by means of the above-mentioned barrier are not expressly different from the conventional case. That is, the barrier is introduced into the blood-collecting tube before or after collecting the blood, the blood is centrifuged, and then the serum part is easily separated by decantation.

Figure 1B:
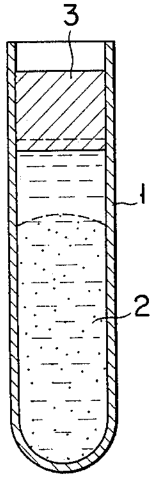
Figure 1C:
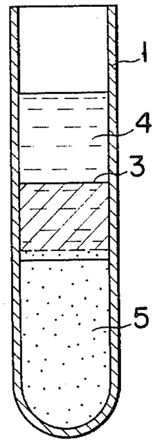

FIGS. 1(A) to 1(C) show processes of centrifuging blood serum by using the blood separator according to the invention. As shown in FIG. 1(A), whole blood 2 is collected in a blood-collecting tube 1, a barrier 3 formed of an elastic porous member is fitted in the opening of the tube 1, and the tube 1 is set in a centrifugal separator for centrifugation. When the centrifugation is started, the barrier 3 is caused gradually to slide down the inside wall of the blood-collecting tube 1 toward the bottom of the tube 1 by centrifugal force, as shown in FIG. 1(B). When the bottom end of the barrier 3 touches the surface of the blood 2, the serum is caused to penetrate into pores of the barrier 3 by capillarity. If the centrifugation is continued, the pores of the barrier 3 are substantially filled with the serum, and the barrier 3 is further slidden down until it is finally held substantially midway between a serum layer 4 and a solid component layer 5. In this case, solid constituents such as blood corpuscles and fibrin are trapped in the pores of the barrier 3 and will never be mixed with the serum. This is ensured because the solid constituents are imprisoned in the continuous pores of the barrier 3 whose framework has a complicated three-dimensional structure.

Thus, the barrier 3 relatively slowly slides down the inside wall of the blood-collecting tube 1 by its elasticity, so that blood corpuscles, fibrin, etc. stuck to the inside wall can be cleared away substantially thoroughly. As a result, there may be obtained serum which does not contain blood corpuscles, fibrin or any other solid matters. The barrier 3 stopped at the interfacial position sticks fast to the inside wall of the blood-collecting tube 1 by its own elasticity, pressing against the inside wall, so that only the serum part can be separated by decantation.

Figure 2:
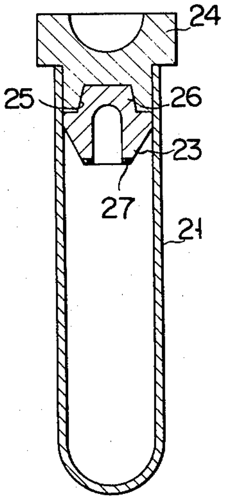
FIG. 2 is a sectional view of the blood separator according to another embodiment wherein a barrier is disposed in a vacuum blood-collecting tube in advance.

The barrier of this invention may be inserted into the blood-collecting tube during centrifugation after blood collection, as in the case of the above embodiment, or otherwise be held in the tube beforehand. FIG. 2 shows an example of the latter case. In FIG. 2, a barrier 23 having an annular hard layer 27 on its bottom is held by a ruber stopper 24 within a vacuum blood-collecting tube 21 the inside of which is kept at a vacuum. That is, the rubber stopper 24 has a cavity 25 at the tip end, while the barrier 23 has on its top a truncated-cone-shaped projection 28 with the outside diameter larger than the diameter of the cavity 25. The projection 28 is fitted and held in the cavity 25 so that the barrier 23 will not be removed from the rubber stopper 24 if the stopper 24 is pierced with a needle for blood collection.

Alternatively, there may be adopted any other suitable methods for previously fixing the barrier in the blood-collecting tube in connection with the shapes of the tube and the barrier itself. For example, a barrier may be fixed to one end of a blood-collecting tube sealed with a rubber stopper at each end, the one end being opposite to the blood intake side of the tube.

Figure 3:
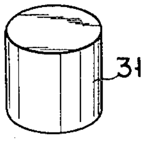
FIGS. 3 and 4 are perspective views illustrating the shapes of barriers.
Figure 4:
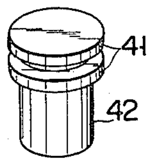
Figure 5:
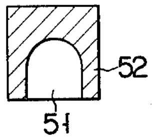
FIGS. 5 to 12 are sectional views showing several modifications of the barrier.
Figure 6:
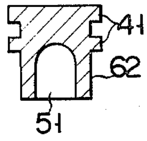
Figure 7:
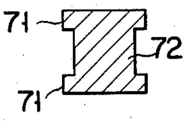
Figure 8:
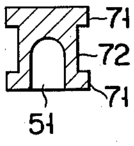
Figure 9:
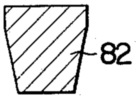
Figure 10:
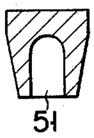
Figure 11:
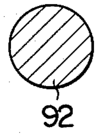
Figure 12:
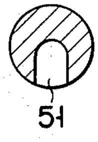
Figure 13A:
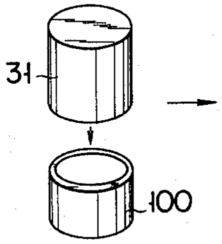
FIG. 13(A) is a perspective disassembled view of the barrier in combination with a tube member.
Figure 13B:
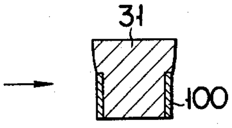
FIG. 13(B) is a sectional view showing the members of FIG. 13(A) in their assembled state.
Figure 14:
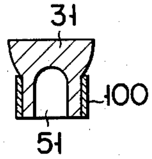
FIG. 14 is a sectional view showing another modification of the barrier of the invention.
Figure 15:
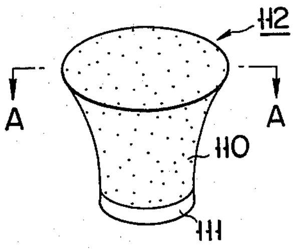
FIG. 15 is a perspective view showing still another modification of the barrier.
Figure 16:
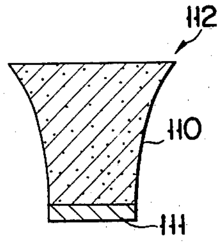
FIG. 16 is a sectional view as taken along line A—A of FIG. 15.

FIGS. 3 to 16 illustrate the respective shapes of several modifications of the barrier; a columnar barrier 31 (FIG. 3) with or without one or more annular flange along the peripheral surface thereof, a barrier 42 (FIG. 4) with a pair of parallel annular flanges 41, a barrier 52 (FIG. 5) similar to the columnar barrier of FIG. 3 but with a cavity 51 on one side thereof, a barrier 62 (FIG. 6) similar to the barrier of FIG. 4 but with the same cavity 51 of FIG. 5, a barrier 72 (FIG. 7) formed of a column with flanges 71 at the top and bottom thereof, a barrier (FIG. 8) of the same structure of FIG. 7 but with the cavity 51, a barrier 82 (FIG. 9) tapered at the lower portion, a barrier (FIG. 10) of the same structure of FIG. 9 but with the cavity 51, a spherical barrier 92 (FIG. 11), a barrier (FIG. 12) of the same structure of FIG. 11 but with the cavity 51, a barrier formed by fitting a small-diameter tube member 100 on the lower peripheral surface of the columnar porous member 31 as shown in FIG. 13(A) to restrict the lower portion of the porous member 31 as shown in FIG. 13(B) so as to reduce the area of contact with the blood-collecting tube, a barrier (FIG. 14) of the same structure of FIGS. 13(A) and 13(B) but with the cavity 51, and a barrier 112 formed by bonding a hard layer 11 to one small-diameter end of an elastic porous member 110 substantially in the form of a truncated cone as shown in FIGS. 15 and 16. The upper portion of the barrier 112, which is brought in close contact with the inside wall of the blood-collecting tube at centrifugation, preferably has a thickness of 3 mm to 5 mm. Available materials for the hard layer 111 include plastics such as polyolefin, polyvinyl chloride, nylon, polyester, polycarbonate, fluorine-contained polymer and polyurethane, and other organic and inorganic substances. These materials should be hard materials which preferably have small contact resistance as against the blood-collecting tube. The hard layer may otherwise be porous such as mesh-like. The thickness of the hard layer preferably ranges from 0.1 mm to 5.0 mm, and more preferably from 0.1 mm to 1.0 mm.

Thus, the barrier shape may enjoy various modifications. The point is that the barrier should have porosity, pore size, and apparent or real specific gravity within prescribed ranges, and be of such suitable size that it may rub against the inside wall of the blood-collecting tube when it slides thereon during centrifugation.

According to this invention, as described above, the barrier, being a simple elastic porous member with or without a plastic tube member or a hard layer attached thereto, is so simple in construction that it can be manufactured very easily at reasonable cost. Since the elastic porous member transmits only the serum to be separated, there may be obtained pure serum containing no solid matters such as blood corpuscles and fibrin.

EXAMPLE 1

A test for separating serum from blood was conducted by using the barrier 52 shown in FIG. 5. Foamed polyurethane with porosity of 98%, pore size of 300μ, true specific gravity of 1.2, 25% compressive hardness (based on JIS K-6401 Test Method) of 20 kg/cm$^2$, and the number of barrier cells of approximately 75/25 mm was used for the barrier. Since the framework of the polyurethane foam has continuous pores of complicated three-dimensional structure and reduces the passage resistance of serum, it had previously been removed by thermally dissolving filmy material formed around the pores at foaming, as described in U.S. Appln. Nos. 203,603 (Mar. 7, 1963), 271,031 (Apr. 5, 1963), 294,861 (July 15, 1963) and 347,246 (Feb. 25, 1964).

The barrier measured 13.7 mm in diameter, 12 mm in height, 4 mm between the center of its top and the peak of the cavity 51, and 2 mm in the thickness of its peripheral wall defining the cavity 51 at the lower portion. The blood vessel (blood-collecting tube) used has the inside diameter of 13.6 mm and accommodates 10 ml of blood.

The barrier 52 of such construction was inserted into the upper portion of the blood-collecting tube which had been left at normal temperature for approximately 60 minutes after collecting blood, and then centrifugation was performed by using a centrifugal separator for 10 minutes with the centrifugal force at the central portion of the tube set at approximately 1,200 G (approx. 1,000 g at the barrier top).

As a result, the barrier 52 was located midway between a blood clot and serum, pressing its cavity 51 against the top of the blood clot. Observation of the blood-collecting tube by the naked eye hardly revealed the existence of any fibrin or blood corpuscles in the serum, which held true after the serum was transferred to another vessel by decantation. Moreover, it was found that the suspended blood corpuscles and fibrin near the surface of the blood clot remained trapped in the continuous pores of the barrier. The yield of the serum collected in this manner proved to be approximately 4.5 ml—substantially the whole quantity of serum separated.

EXAMPLE 2

The barrier 31 shown in FIG. 13 was manufactured by using the same foamed polyurethane of Example 1. In this case, however, the barrier 31 had no cavity, and the tube 100 of 3 mm-height, 12.2 mm inside diameter and 13.0 mm outside diameter was fitted on the lower portion of the columnar porous member 31 (foamed polyurethane) of 13.7 mm diameter and 12 mm-height. The tube 100 was made of polyethylene, and was provided at the bottom end with an abutment portion (not shown) to engage the bottom end of the porous member 31.

This barrier was inserted through the opening of the blood-collecting tube (the same one as Example 1) containing blood, which had been kept at normal temperature for 60 minutes, to a depth where the barrier touched the blood surface. After leaving the barrier for a while, centrifugation was carried out under the normal conditions so that the centrifugal force at the central portion of the blood-collecting tube might become approximately 1,200 G.

Also in this case, there was noticed no eduction of fibrin. As compared with the case of Example 1, however, the volume of the barrier was larger, so that the yield of serum proved to be somewhat poorer—approximately 4.0 ml.

Also with this example, decantation caused neither shifting of the barrier nor mixing of blood corpuscles or fibrin.

The outside diameter of the tube 100 was smaller than the inside diameter of the blood-collecting tube, and the upper side wall of the porous member 31 was so designed as to form a slope. Therefore, the barrier touched the inside wall of the blood-collecting tube only at the opening portion thereof when it was fitted in the tube. Consequently, the barrier was never prevented from descending by the viscosity of blood sticking to the upper portion of the inside wall of the blood-collecting tube after being left for a while.

EXAMPLE 3

The barrier shown in FIG. 14 was manufactured to obtain the same effect as the barrier of Example 2 and to maximize the yield of serum. The porous member 31 used was just the same as the porous member used in Example 2 in material, dimensions and shape, except that it was provided with the cavity 51 defined therein at the lower portion. Also, the tube 100 made of thermally contractive polyvinyl chloride was fitted on the lower portion of the porous member 31. The tube 100 measured about 13μ in thickness, 12.0 mm in outside diameter, and 6 mm in height when it was fitted on the porous member 31. The bottom end of the tube 100 and the bottom joint part of the porous member 31 were bonded together at several portions by heat deposition.

When the same test as Example 2 was conducted by using this barrier, satisfactory yield (approx. 4.5 ml) of serum was obtained with quite the same effect.

EXAMPLE 4

Serum separation was conducted in the same manner as Example 1 by using the barrier 112 consisting of the elastic porous member 110 which is formed of the same foamed polyurethane of Example 1 and has the form of a truncated cone as shown in FIGS. 15 and 16, measuring 15.5 mm in diameter across the upper large-diameter section, 12.8 mm in diameter across the lower small-diameter section, and 9 mm in height, and the hard layer 111 which is formed of a hard polyvinyl chloride film of 200μ thickness bonded to the bottom face of the porous member 110. As a result, serum with no fibrin or blood corpuscles mixed therein was able to be obtained by decantation.

In connection with this example, substantially the same results were obtained when serum separation were conducted in the same manner as aforesaid except that the hard layer 111 was formed, instead of by using the hard polyvinyl chloride film, by impregnating two-liquid polyurethane resin into the bottom portion of the porous member 110 to a thickness of approximately 1 mm and hardening the resin, or by bonding a polyester mesh (mesh size being 14, diameter of each strand 450μ and specific gravity 1.38, sold under a trade mark, TB15 by NBC Industries Co. Ltd., Japan) to the bottom face of the porous member 110.

We claim:

1. A method for separating blood collected in a blood-collecting tube into a serum part and a solid component part by centrifugation, comprising:
   - introducing a barrier formed of an elastic foamed plastic member into said blood-collecting tube, said elastic foamed plastic member having a porosity of 97 to 98%, a continuous-pore size of 50 to 400μ, the pores of said elastic foamed plastic member being thermally treated for dissolving a filmy material formed around the pores in the foaming step, an overall true specific gravity greater than that of said serum part, and a frusto-conical upper portion, the upper cross section of which is larger than the cross section of said blood-collecting tube;
   - moving said elastic foamed plastic member to the interface between a serum part layer and a solid component layer in the blood by centrifugal force produced in centrifuging the blood; and
   - separating serum in the blood.

2. A method according to claim 1, wherein said elastic foamed plastic member is previously fixedly disposed in said blood-collecting tube which is kept at a vacuum before the blood is collected in said blood-collecting tube.

3. A method according to claim 2, wherein said blood-collecting tube has a blood intake side, and the fixed position of said elastic foamed plastic member in said blood-collecting tube lies at one end of said tube on said blood intake side thereof.

4. A method according to claim 2, wherein said blood-collecting tube has a blood intake side, and the fixed position of said elastic foamed plastic member in said blood-collecting tube lies at the other end of said blood-collecting tube opposite to said blood intake side.

5. A method according to claim 1, wherein said elastic foamed platic member is fitted in said blood-collecting tube after the blood is collected in said tube.

6. A method according to any one of claims 1 to 5, wherein a tube member having smaller outside diameter than the inside diameter of said blood-collecting tube is fitted on the lower part of the peripheral side of said elastic foamed plastic member, the combination of said tube member and said elastic foamed plastic member having greater real specific gravity than that of said serum part.

7. A method according to claim 6, wherein the real specific gravity of the combination of said tube member and said elastic foamed plastic member is greater than that of said serum part and is also greater than that of the solid component layer in the blood to such a degree that said solid component layer may not substantially be destroyed during centrifugation.

8. A method according to any one of claims 1 to 5, wherein the real specific gravity of said elastic foamed plastic member is greater than that of said serum part and is also greater than that of the solid component layer in the blood to such a degree that said solid component layer may not substantially be destroyed during centrifugation.

9. A method according to claim 1, wherein said elastic foamed plastic member is bottomed with a hard layer, and wherein the overall specific gravity of said elastic foamed plastic member including said hard layer is greater than that of said serum part.

10. A method according to claim 1, wherein the overall true specific gravity of said barrier is greater than that of blood corpuscles.

11. A barrier for centrifugation of blood to be introduced into a blood-collecting tube, comprising an elastic foamed plastic member having porosity of 97 to 98%, continuous-pore size of 50 to 400μ, overall true specific gravity greater than that of serum, the pores of the elastic foamed plastic member being thermally treated for dissolving a filmy material formed around the pores in the foaming step of fabrication thereof, said elastic foamed plastic member having a frusto-conical upper portion, the upper cross section of which is a little larger than that of said blood-collecting tube.

12. A barrier according to claim 11, wherein a tube member having smaller outside diameter than the inside diameter of said blood-collecting tube is fitted on the lower part of the peripheral side of said elastic foamed plastic member, the combination of said tube member and said elastic foamed plastic member having a greater real specific gravity than that of said serum part of the blood.

13. A barrier according to claim 11, wherein said elastic foamed plastic member has a hard layer on the bottom thereof, and wherein the overall specific gravity of said elastic porous member including said hard layer is greater than that of said serum part of the blood.

14. A barrier according to claim 13, wherein said hard layer is formed of hard plastic which is impregnated into the bottom portion of said elastic foamed plastic member and solidified.

15. A barrier according to claim 13, wherein said hard layer is formed of a hard plastic sheet which is put on the bottom surface of said elastic foamed plastic member.

16. A barrier according to claim 13, wherein said hard layer is formed of a hard plastic mesh which is put on the bottom surface of said elastic foamed plastic member.

* * * * *